(12) United States Patent
Mirmobin et al.

(10) Patent No.: US 7,636,031 B2
(45) Date of Patent: Dec. 22, 2009

(54) SENSOR SYSTEM INCLUDING MULTIPLE RADIO FREQUENCY IDENTIFICATION TAGS

(75) Inventors: Parsa Mirmobin, Oro Valley, AZ (US); Andrew J. Brackenbury, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 625 days.

(21) Appl. No.: 11/416,280

(22) Filed: May 1, 2006

(65) Prior Publication Data

US 2007/0252691 A1 Nov. 1, 2007

(51) Int. Cl.
*H04Q 5/22* (2006.01)
(52) U.S. Cl. ............... 340/10.1; 324/207.14; 324/243; 235/462.17; 235/435
(58) Field of Classification Search .......... 340/10.1; 324/243, 207.14; 235/435, 462.17
See application file for complete search history.

(56) References Cited

U.S. PATENT DOCUMENTS

| | | | | |
|---|---|---|---|---|
| 4,450,431 A | * | 5/1984 | Hochstein | .......... 340/447 |
| 5,235,318 A | | 8/1993 | Schulcz | |
| 5,317,303 A | | 5/1994 | Ross et al. | |
| 5,448,220 A | * | 9/1995 | Levy | .......... 340/539.26 |
| 5,499,013 A | | 3/1996 | Konotchick | |
| 6,087,930 A | | 7/2000 | Kulka et al. | |
| 6,249,212 B1 | | 6/2001 | Beigel et al. | |
| 6,411,213 B1 | | 6/2002 | Vega et al. | |
| 6,563,417 B1 | * | 5/2003 | Shaw | .......... 340/10.1 |
| 6,720,866 B1 | * | 4/2004 | Sorrells et al. | .......... 340/10.4 |
| 6,774,782 B2 | | 8/2004 | Runyon et al. | |
| 6,917,291 B2 | | 7/2005 | Allen | |
| 6,925,287 B2 | | 8/2005 | Davie et al. | |
| 6,927,687 B2 | | 8/2005 | Carrender | |
| 2002/0075144 A1 | | 6/2002 | DeZorzi | |
| 2002/0075146 A1 | | 6/2002 | Saheki | |
| 2002/0154029 A1 | | 10/2002 | Watters et al. | |
| 2004/0049428 A1 | | 3/2004 | Soehnlen et al. | |
| 2004/0113790 A1 | | 6/2004 | Hamel et al. | |
| 2004/0150529 A1 | | 8/2004 | Benoit et al. | |
| 2004/0233054 A1 | | 11/2004 | Neff et al. | |
| 2005/0007250 A1 | | 1/2005 | Lee et al. | |
| 2005/0087235 A1 | | 4/2005 | Skorpik et al. | |
| 2005/0088299 A1 | | 4/2005 | Bandy et al. | |
| 2005/0093690 A1 | | 5/2005 | Miglionico | |
| 2005/0176373 A1 | | 8/2005 | Gilbert et al. | |
| 2005/0192727 A1 | | 9/2005 | Shostak et al. | |
| 2005/0252979 A1 | * | 11/2005 | Konuma et al. | .......... 235/492 |
| 2005/0258955 A1 | | 11/2005 | Gloekler et al. | |
| 2005/0270153 A1 | | 12/2005 | Kwon et al. | |

(Continued)

FOREIGN PATENT DOCUMENTS

JP 2005134957 5/2005

(Continued)

*Primary Examiner*—Daniel Wu
*Assistant Examiner*—Bradley E Thompson
(74) *Attorney, Agent, or Firm*—Fogg & Powers LLC

(57) ABSTRACT

A sensor system includes a sensor circuit and a plurality (e.g., N-number) of radio frequency identification (RFID) tags. The sensor circuit senses a physical parameter and supplies N-bits of digital sensor data. Each of the RFID tags at least selectively receives a digital sensor signal representative of one of the N-bits of digital sensor data and selectively transmits the digital sensor signal it received.

20 Claims, 3 Drawing Sheets

U.S. PATENT DOCUMENTS

| | | | |
|---|---|---|---|
| 2006/0178695 A1* | 8/2006 | Decant et al. | 606/200 |
| 2006/0267731 A1* | 11/2006 | Chen | 340/10.1 |
| 2007/0057773 A1* | 3/2007 | Hsieh et al. | 340/10.41 |
| 2007/0252691 A1* | 11/2007 | Mirmobin et al. | 340/539.22 |
| 2008/0150696 A1* | 6/2008 | Bolander et al. | 340/10.3 |

FOREIGN PATENT DOCUMENTS

| | | |
|---|---|---|
| WO | WO0184518 | 11/2001 |
| WO | WO03098175 | 11/2003 |
| WO | WO2006002534 | 1/2006 |

* cited by examiner

SENSOR SYSTEM INCLUDING MULTIPLE RADIO FREQUENCY IDENTIFICATION TAGS

TECHNICAL FIELD

The present invention relates to sensors and, more particularly, to a sensor system that uses multiple radio frequency identification (RFID) tags to transmit sensor data.

BACKGROUND

Sensors are used in myriad systems and for various applications to sense, and supply signals representative of, various physical parameters. For example, many aircraft include numerous and varied sensors to sense temperature, pressure, flow, and fluid level, just to name a few physical parameters. Typically, these sensors supply analog sensor signals representative of the sensed physical parameter to one or more electric or electronic sensor circuits, which may include, among other devices, various signal conditioning circuits, filters, amplifiers, and signal conversion circuits.

In many instances, sensor circuits do not include any, or sufficient, storage capability for acquired sensor data. As a result, acquisition, processing, and/or control circuits that ultimately use the acquired sensor data may be closely coupled to the various sensors. This approach generally works well, and is typically safe and reliable; however, this approach can suffer certain drawbacks. Namely, with this approach it may not be possible or desirable, in all situations, to closely couple sensor circuits to associated acquisition, processing, and/or control circuits. Although various types of remote sensors have been developed to address such issues, many remote sensors can be relatively expensive, and may not be compatible with some sensor circuits.

Hence, there is a need for a sensor system that does not need to be closely coupled to associated acquisition, processing, and/or control circuits, that is relatively inexpensive, and/or that does not suffer incompatibility issues. The present invention addresses one or more of these needs.

BRIEF SUMMARY

The present invention provides a relatively inexpensive remote sensor system. In one embodiment, and by way of example only, a sensor system includes a sensor circuit and N-number of radio frequency identification (RFID) tags. The sensor circuit is operable to sense a parameter and supply N-bits of digital sensor data. Each RFID tag is coupled to at least selectively receive a digital sensor signal representative of one of the N-bits of digital sensor data and is operable to selectively transmit the digital sensor signal received thereby.

In another exemplary embodiment, a sensor system includes a sensor circuit, N-number of radio frequency identification (RFID) tags, and an RFID reader. The sensor circuit is operable to sense a parameter and supply N-bits of digital sensor data. Each RFID tag is configured to selectively receive a digital sensor signal representative of one of the N-bits of digital sensor data, and to selectively transmit the digital sensor signal received thereby. The RFID reader is operable to selectively receive the digital sensor signal selectively transmitted from each of the RFID tags.

Other independent features and advantages of the preferred sensor system will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description.

Figure 1:
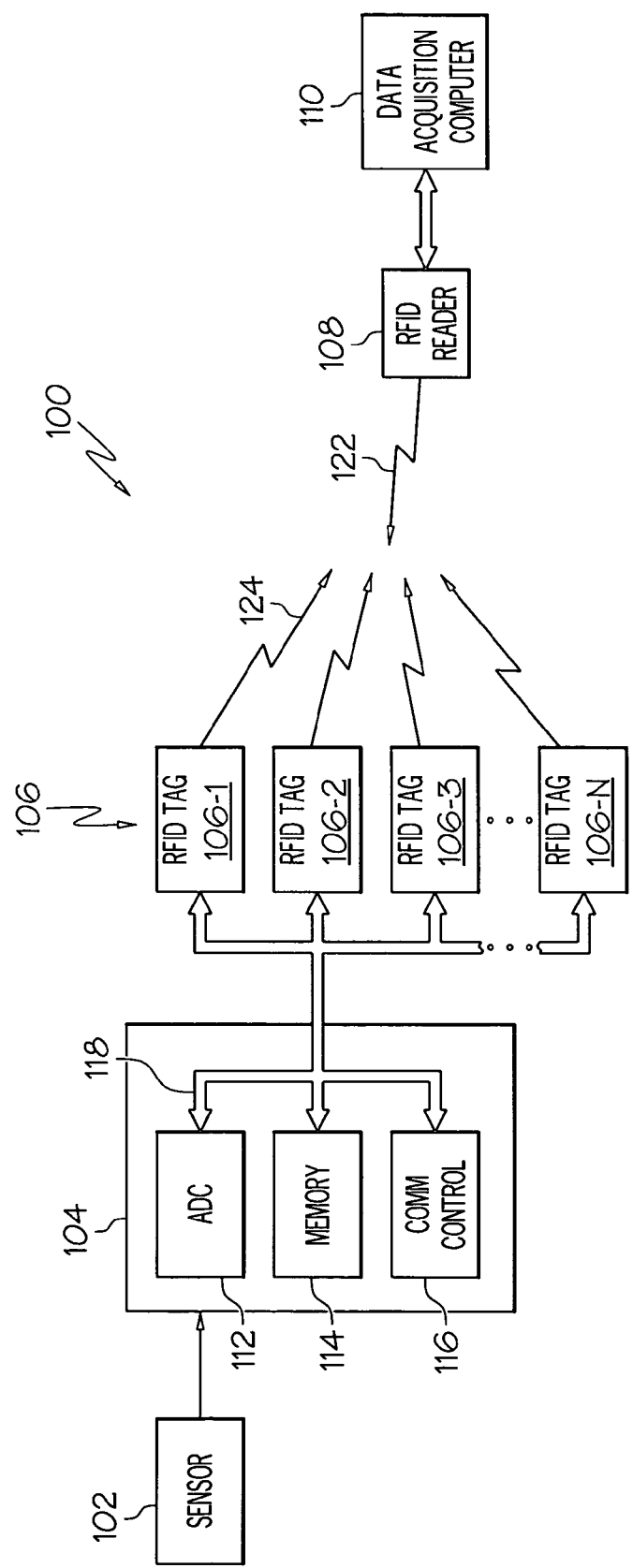
FIGS. 1 and 2 are functional block diagrams of sensor systems according to exemplary alternative embodiments of the present invention.
Figure 2:
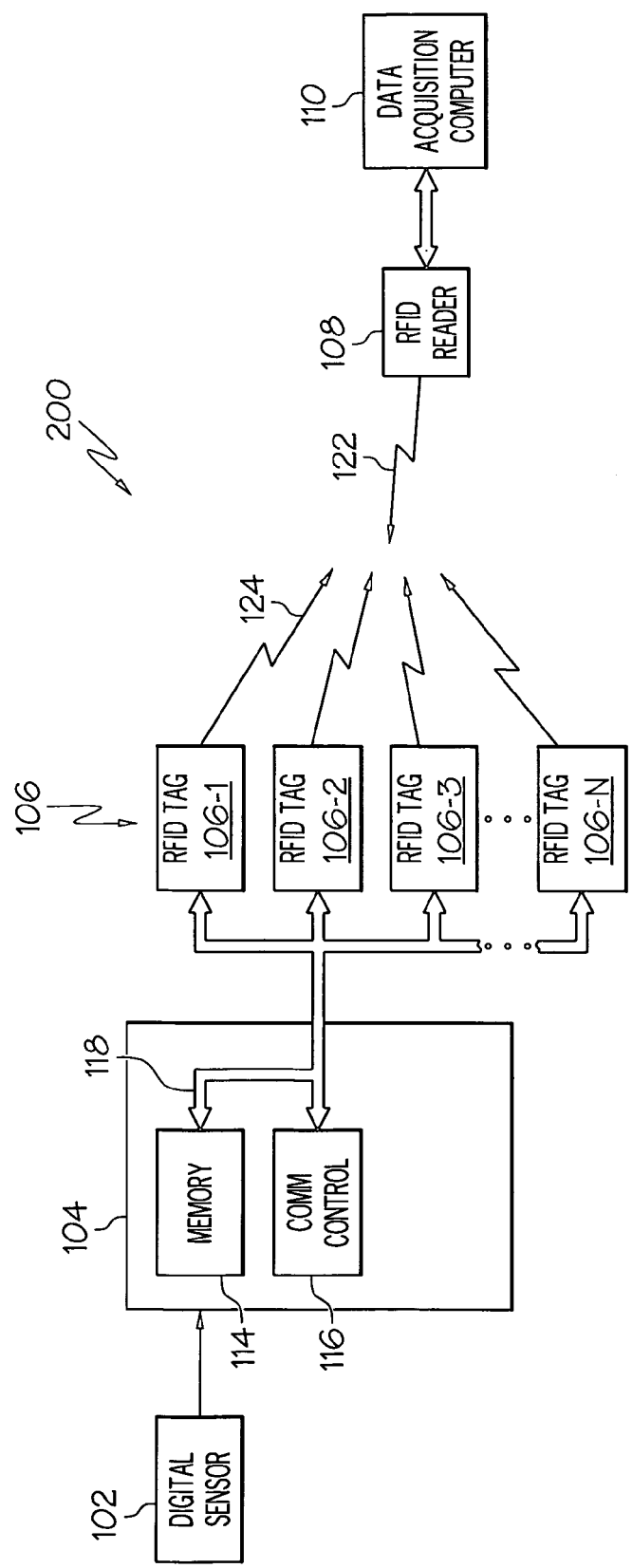
Figure 3:
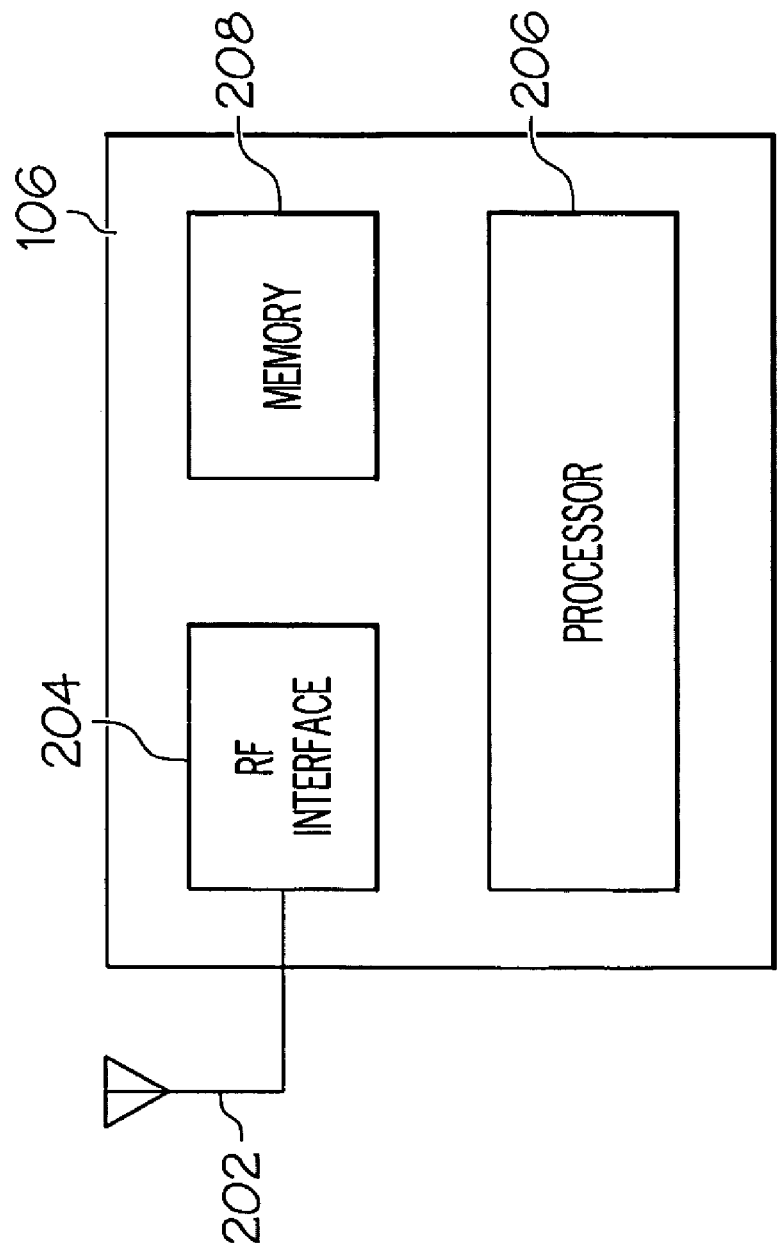
FIG. 3 is a functional block diagram of an exemplary radio frequency identification (RFID) tag that may be used to implement the systems of FIGS. 1 and 2.

With reference to FIGS. 1 and 2, functional block diagrams of exemplary sensor systems 100, 200 are depicted, and each includes a sensor 102, a sensor signal processor 104, a plurality of radio frequency identification (RFID) tags 106, and an RFID reader 108. The sensor 102 may be any one of numerous types of sensors that are operable to sense a physical parameter. For example, the sensor 102 may be any one of numerous types of temperature, pressure, flow, or fluid level sensors, just to name a few. No matter the particular physical parameter being sensed, and the particular type of sensor being used, the sensor 102 is operable to supply sensor signal representative of the sensed physical parameter to the sensor signal processor 104.

In the embodiment depicted in FIG. 1, the sensor 102 is an analog sensor that supplies an analog sensor signal to the sensor signal processor 104. Thus, in this embodiment, the sensor signal processor 104 includes at least an analog-to-digital converter (ADC) 112 and, in at least the depicted embodiment, additionally includes memory 114, and a communication control circuit 116, all in operable communication with one another via a communication bus 118. In the embodiment depicted in FIG. 2, the sensor 102 is a digital sensor that supplies digital sensor signal to the sensor signal processor 104. Thus, in this embodiment, the sensor signal processor 104 does not include the ADC 112, but does include the memory 114, and the communication control circuit 116, in operable communication with one another via the communication bus 118. Before proceeding with a description of the sensor signal processor 104, it should be appreciated that in alternative embodiments the sensor systems 100, 200 could be implemented without either or both of the memory 114 and the communication control circuit 116.

The ADC 112 is coupled to receive the analog sensor signal from the sensor 102, and converts the analog sensor signal to equivalent digital sensor data by sampling the analog sensor signal at a predetermined sampling rate. In the depicted embodiment, the ADC 112 is implemented with N-bits of resolution, and thus converts the analog sensor signal to N-bits of digital sensor data. The ADC 112 may be any one of numerous ADCs known in the art for providing this functionality, and may be implemented with any one of numerous magnitudes of resolution. For example, in a particular preferred embodiment, the ADC 112 is implemented using an ADC 112 having 8-bits of resolution, which thus converts the analog sensor signal to 8-bits of digital sensor data.

The memory 114, which may be implemented using any one of numerous types of random access memory (RAM), is configured to selectively receive and store the N-bits of digital sensor data supplied by the ADC 112. The memory 114 is periodically refreshed at a predetermined rate, which is preferably the same rate as the sampling rate of the ADC 112. Although the size of the memory 114 may vary, it is preferably wide enough to retain the results of only the most recent analog-to-digital conversion conducted by the ADC 112. Thus, the memory 114 is preferably at least N-bits wide, though it could be slightly wider. No matter its specific width, the N-bits of digital sensor data that are stored in the memory 114 are sequentially shifted out of the memory 114 under the control of the communication control circuit 116.

The communication control circuit 116 is preferably configured to control the overall operation of the sensor signal processor 104. In particular, the communication control circuit 116 is preferably configured to control the operation and sampling rate of the ADC 112, the refresh rate of the memory 114 and, as was just noted, the rate at which the stored digital sensor data are shifted out of the memory 114. In addition, the communication control circuit 116 preferably includes information that identifies the units of the physical parameter being sensed (e.g., ° C., ° K, ° F, psi, Pa, inches, millimeters, etc.), and any calibration data associated with the sensor. It will be appreciated that the communication control circuit 116 may be implemented using any one of numerous known general-purpose microprocessors or an application specific processor or controller. It will additionally be appreciated that the communication control circuit 116 may implement its functions autonomously, or in response to one or more signals received from one or more of the RFID tags 106.

The RFID tags 106 are each coupled to receive a digital sensor signal representative of one of the N-bits of digital sensor data stored in memory 114, and are each configured to selectively transmit a digital sensor signal representative of the single bit of digital sensor data that the RFID tag 106 receives. Preferably, the sensor system 100 includes at least one RFID tag 106 for each bit of resolution of the ADC 112. Thus, in the depicted embodiment, in which the ADC 112 has N-bits of resolution, the sensor system 100 includes N-number of RFID tags 106 (e.g., 106-1, 106-2, 106-3, . . . , 106-N), each of which is used to transmit a digital sensor signal representative of the single bit of digital sensor data that it receives.

It will be appreciated that the RFID tags 106 are generally identical, with the exception of the individual RF transmission frequencies of each RFID tag 106. In particular, each RFID tag 106 is preferably configured to transmit the digital sensor signal received thereby at an RF transmission frequency that differs from the other RFID tags 106. It will additionally be appreciated that each of the RFID tags 106 may be implemented using any one of numerous known types of RFID tags, the overall functions and structures of which are generally known. Thus, although a description of an exemplary embodiment of the RFID tags 106 is not needed to provide either an enabling or fully descriptive disclosure, such a description will nonetheless be provided. Before doing so, however, a brief overview of RFID tag operational types will, for completeness, be provided.

As is generally known, an RFID tag may be implemented as an active tag, a semi-active tag, or a passive tag. An active RFID tag typically includes an on-board power source, such as an internal battery, to transmit data, and typically includes the ability to read and write greater amounts of stored data than either passive or semi-passive tags. It will be appreciated, however, that active RFID tags can be implemented without an on-board power source. A passive RFID tag includes no on-board power source, and transmits data by reflecting and absorbing energy from interrogation signals transmitted from, for example, the RFID reader 108. In some embodiments a passive RFID tag may additionally use energy absorbed from the interrogation signals for data storage, retrieval, and manipulation. A semi-passive tag is somewhat of a hybrid of the active and passive tags. In particular, a semi-passive tag includes an on-board power source, such as an internal battery, to power, for example, volatile memory or an on-board processor but, similar to a passive tag, transmits data by reflecting and absorbing energy from the RFID reader. In addition, some RFID tags are implemented as multi-mode tags that, among other things, can operate as either a passive tag or a semi-passive tag.

Turning now to FIG. 2, a simplified functional block diagram of an exemplary embodiment of an RFID tag that may be used to implement each of the RFID tags 106 in the sensor system 100 is depicted, and will now be described in more detail. The depicted RFID tag 106 includes an RFID tag antenna 202, an RF interface 204, a tag processor 206, and tag memory 208. It will be appreciated that the RFID tag 106 need not include all of these circuits, and could additionally include various other circuits and components. However, these other circuits and components, though potentially useful, are not needed to understand or implement the claimed invention. Thus, these additional components are, for the sake of brevity, neither described nor depicted herein.

The RFID tag antenna 202, which may be any one of numerous known RFID antennas, is coupled to the RF interface 204, which may similarly be implemented using any one of numerous known RF interface circuit configurations. The RFID tag antenna 202 and RF interface 204 are configured to receive RFID interrogation signals 122 from, and to emit RFID response signals 124 to, the RFID reader 108 (see FIG. 1). It will be appreciated that the RF interface 204 may include, for example, one or more storage capacitors to store energy received by the RFID antenna 202, if the RFID tag 106 is not powered by an internal storage battery (e.g., is a passive tag), or is powered by both an internal storage capacitor and a battery (e.g., a semi-passive tag).

The tag processor 206 may be any one of numerous known general-purpose microprocessors or an application specific processor that operates in response to program instructions. In the depicted embodiment, the tag processor 206, among other things, controls the overall operation of the RF interface 204, and data read and write operations from and to, respectively, the tag memory 208. Moreover, if the RFID tag 106 is implemented as a multi-mode type of tag, the tag processor 206 may additionally run a tag emulation selection routine that switches the type of tag paradigm that the RFID tag 106 will emulate (e.g., active, semi-passive, or passive).

The tag memory 208, if included, is in operable communication with the tag processor 206 and stores various types of data. The stored data, as was just alluded to above, may be selectively retrieved by, or supplied from, the tag processor 206. The stored data may include, for example, program instructions, tag identification data, and digital sensor data supplied from the memory 114. As is generally known, the tag identification data are sent as part of an RFID response signal 124 transmitted to the RFID reader 108. The tag memory 208 is preferably non-volatile memory; however, it will be appreciated that it could be any one of numerous types of memory or memory subsystems including, for example, a collection or combination of read-write volatile memory, read only non-volatile, read/write non-volatile. It will additionally be appreciated that the tag memory 208 may be physically implemented in any one of numerous known configurations including, for example, flash memory, EEPROM, ferro-electric random access memory (FRAM), magneto-resistive RAM/ROM, magnetic RAM/ROM, one or more magnetic storage devices, or one or more optical storage devices.

Returning once again to FIG. 1, and to a description of the remaining sections of the sensor system 100, the RFID reader 108 (or "transponder," as it is sometimes referred to), in one embodiment, is configured to selectively transmit RFID interrogation signals 122 to, and to selectively receive RFID response signals 124 from, each of the RFID tags 106. More specifically, and as is generally known, the RFID interrogation signals 122 transmitted by the RFID reader 108 may include an identifier that specifies which of the individual RFID tags 106 is being interrogated. In such an embodiment, the RFID reader 108 transmits a different RFID interrogation signal 122 to each RFID tag 106-1, 106-2, 106-3, . . . 106-N. The identified RFID tag 106-1, 106-2, 106-3, . . . 106-N, in response to the interrogation signal 122, transmits an RFID response signal 124 at its individual RF transmission frequency. It will be appreciated that the RFID response signal 124 transmitted by each RFID tag 106 includes at least the digital sensor signal representative of a single bit of digital sensor data.

The RFID reader 108 is preferably configured to selectively transmit RFID interrogation signals 122 in those embodiments in which the RFID tags 106 are implemented as passive, semi-passive, or multi-mode tags. In other embodiments, in which the RFID tags 106 are each implemented as active tags, the RFID reader 108 is preferably configured to continuously monitor for, and to receive, any RFID response signals 124 supplied from each of the RFID tags 106. In both embodiments, the RFID reader 108 is also preferably configured to convert the RFID response signals 124 supplied from each of the RFID tags 106 into an N-bit digital data packet representative of the value of the physical parameter sensed by the sensor 102. The digital data packet may be, for example, a digital byte, a digital word, or a digital double word, depending on the resolution of the ADC 112 and concomitantly on the number of RFID tags 106. No matter the size or format of the digital data packet, each data packet is then transmitted to an end-user device or system such as, for example, a data acquisition computer 110.

The data acquisition computer 110 may be coupled to the RFID reader 108 either wirelessly or via one or more wired connections, and may be used to simply store the data packet for later use, to process the data packet and display the value of the sensed physical parameter, or both. The data acquisition computer 110 may instead, or additionally, be implemented as a control device that controls the position or operation of a device based on the value of the sensed physical parameter. It will be appreciated that the data acquisition computer 110 may instead, or additionally, be used to supply, via the RFID reader 108 and one or more of the RFID tags 106, updated calibration data to the communication control circuit 116, if so desired.

Turning now to an overall operational description of the sensor system 100, in one exemplary embodiment thereof, the RFID tags 106 are each preferably implemented as passive tags, or alternatively as either semi-passive tags or as multi-mode tags. Nonetheless, in each of these instances, each of the RFID tags 106 transmits a digital sensor signal representative of a single bit of digital sensor data (e.g., an RFID response signal 124) only in response to an interrogation signal 122 transmitted by the RFID reader 108. More specifically, the RFID reader 108, either autonomously or in response to a command from, for example, the data acquisition computer 110, transmits an RFID interrogation signal 122 to each RFID tag 106. The interrogated RFID tag 106, upon receipt of the interrogation signal 122, becomes activated.

Upon being activated, the RFID tag 106 receives a digital sensor signal representative of one of the N-bits of digital sensor data that are stored in memory 114. The RFID tag 106 may receive its digital sensor signal automatically upon being activated or, as noted above, it may supply a signal to the communication control device 116, which commands or alerts the communication control device 116 to supply the appropriate digital sensor signal to the activated RFID tag 106. For either implementation, the digital sensor signal supplied to each RFID tag 106 preferably includes not only information regarding the physical parameter values measured by the sensor 102, but, as was alluded to above, information regarding the units of the sensed physical parameter and/or any calibration data.

Once the activated RFID tag 106 receives its digital sensor signal from the memory 114, it in turn transmits the digital sensor data to the RFID reader 108 at its individual RF transmission frequency. When the RFID reader 108 receives the digital sensor signals from each of the RFID tags 106, which represents the N-bits of the most recent analog-to-digital conversion, it converts these signals into a digital data packet representative of the value of the physical parameter sensed by the sensor 102, and supplies the digital data packet to, for example, the data acquisition computer 110.

When the sensor system 100 is implemented with active RFID tags 106, in which each RFID tag 106 receives its operational power from an on-board power source, the system 100 is configured to operate slightly differently. Specifically, the RFID tags 106 are not configured to receive and transmit associated digital sensor signals in response to RFID interrogation signals 122. Rather, each of the RFID tags 106 is configured to continuously receive its associated digital sensor data each time the memory 114 is refreshed with newly converted digital sensor data from the ADC 112. If the digital sensor data received by an RFID tag 106 is representative of a logical 1, then the RFID tag 106 will transmit an RFID signal 124. Conversely, if the digital sensor data received by an RFID tag 106 is representative of a logical 0, then the RFID tag 106 will not transmit an RFID signal 124.

When active RFID tags 106 are used, the RFID reader 108 is also configured to operate slightly differently. In particular, rather than selectively transmit RFID interrogation signals 122 to the RFID tags 106, the RFID reader 108 continuously monitors each of the RFID tags 106, preferably in synchronism with the sampling of the ADC 112 and associated refreshing of the memory 114. As noted above, when an RFID tag 106 transmits an RFID signal 124, its associated digital sensor signal is representative of a logical 1, and when an RFID tag 106 does not transmit an RFID signal 124, its associated digital sensor signal is representative of a logical 0. The RFID reader 108, based upon whether each RFID tag 106 transmits or does not transmit an RFID signal 124, supplies an N-bit digital data packet to, for example, the data acquisition computer 110.

It will be appreciated that the second implementation described above could be alternatively configured such that the RFID tags 106 transmit an RFID signal 124 regardless of the logic level that its associated digital sensor signal represents. In this alternative to the second embodiment, the RFID tags are configured to emit an RFID signal 124 of a first characteristic (e.g., amplitude, frequency, etc.) if its associated digital sensor data is representative of a logical 0, and emit an RFID signal 124 of a different characteristic if its associated digital sensor data is representative of a logical 1.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A sensor system, comprising:
a sensor circuit operable to sense a parameter and supply N-bits of digital sensor data, wherein N is an integer greater than one and the combination of the N-bits of digital sensor data comprise an N-bit digital data packet; and
N-number of radio frequency identification (RFID) tags, each RFID tag coupled to at least selectively receive a digital sensor signal representative of one of the N-bits of digital sensor data and operable to selectively transmit the digital sensor signal received thereby, wherein each RFID tag selectively receives a digital sensor signal representative of a different one of the N-bits of digital sensor data from the other RFID tags.

2. The sensor system of claim 1, wherein:
each RFID tag is configured to selectively transmit the digital sensor signal received thereby at an RF transmission frequency; and
the RF transmission frequency of each RFID tag differs from that of the other RFID tags.

3. The sensor system of claim 1, wherein:
each of the N-bits of digital sensor data is representative of either a logical 1 or a logical 0; and
each RFID tag selectively transmits the digital sensor signal received thereby only when the received digital sensor data is representative of a logical 1.

4. The sensor system of claim 1, wherein the sensor circuit comprises:
an analog sensor operable to sense a parameter and supply an analog sensor signal representative of the sensed parameter;
an analog-to-digital converter (ADC) having N-bits of resolution, the ADC coupled to receive the analog sensor signal and operable to convert the analog sensor signal to the N-bits of digital sensor data.

5. The sensor system of claim 1, further comprising:
memory in operable communication with the ADC and configured to selectively store the N-bits of digital sensor data.

6. The sensor system of claim 5, wherein each of the RFID tags is in operable communication with, and is configured to selectively receive the digital sensor signal selectively stored in, the memory.

7. The sensor system of claim 1, further comprising:
a communication control circuit in operable communication with, and configured to control operation of, the ADC.

8. The sensor system of claim 1, further comprising:
memory in operable communication with the sensor circuit and configured to selectively store the N-bits of digital sensor data; and
a communication control circuit in operable communication with the ADC and the memory, the communication control circuit operable to control operations of the ADC and the memory.

9. The sensor system of claim 1, further comprising:
an RFID reader operable to receive the digital sensor signal selectively transmitted from each of the RFID tags.

10. The sensor system of claim 9, wherein:
the RFID reader is further operable to selectively transmit an interrogation signal to each of the RFID tags; and
each of the RFID tags is responsive to the interrogation signal to transmit the received digital sensor signal.

11. The sensor system of claim 1, wherein each of the RFID tags is selected from the group consisting of a passive tag, a semi-passive tag, and an active tag.

12. A sensor system, comprising:
a sensor circuit operable to sense a parameter and supply N-bits of digital sensor data, wherein N is an integer greater than one and the combination of the N-bits of digital sensor data comprise an N-bit digital data packet;
N-number of radio frequency identification (RFID) tags, each RFID tag configured to (i) selectively receive a digital sensor signal representative of one of the N-bits of digital sensor data, wherein each RFID tag selectively receives a digital sensor signal representative of a different one of the N-bits of digital sensor data from the other RFID tags, and (ii) selectively transmit the digital sensor signal retrieved thereby; and
an RFID reader operable to receive the digital sensor signal selectively transmitted from each of the RFID tags.

13. The sensor system of claim 12, wherein:
each RFID tag is configured to selectively transmit the digital sensor signal received thereby at an RF transmission frequency; and
the RF transmission frequency of each RFID tag differs from that of the other RFID tags.

14. The sensor system of claim 12, wherein:
each of the N-bits of digital sensor data is representative of either a logical 1 or a logical 0; and
each RFID tag selectively transmits the sensor system data received thereby only when the received sensor system data is representative of a logical 1.

15. The sensor system of claim 12, wherein:
the RFID reader is further configured to selectively transmit an interrogation signal to each of the RFID tags; and
each RFID tag is configured to selectively receive and transmit the digital sensor signal in response to the interrogation signal transmitted thereto.

16. The sensor system of claim 12, wherein the sensor circuit comprises:
an analog sensor operable to sense a parameter and supply an analog sensor signal representative of the sensed parameter;
an analog-to-digital converter (ADC) having N-bits of resolution, the ADC coupled to receive the analog sensor signal and operable to convert the analog sensor signal to the N-bits of digital sensor data.

17. The sensor system of claim 16, further comprising:
memory in operable communication with the ADC and configured to selectively store the N-bits of sensor system data; and
a communication control circuit in operable communication with the ADC and the memory, the communication control circuit operable to control operations of the ADC and the memory, wherein each of the RFID tags is in operable communication with, and is configured to selectively receive the digital sensor signal selectively stored in, the memory.

18. The sensor system of claim 12, wherein each of the RFID tags is selected from the group consisting of a passive tag, a semi-passive tag, and an active tag.

19. A sensor system data collection and storage system, comprising:
- a sensor circuit operable to sense a parameter and supply N-bits of digital sensor data, wherein N is an integer greater than one and the combination of the N-bits of digital sensor data comprise an N-bit digital data packet;
- N-number of radio frequency identification (RFID) tags, each RFID tag configured to (i) selectively receive a digital sensor signal representative of one of the N-bits of digital sensor data, wherein each RFID tag selectively receives a digital sensor signal representative of a different one of the N-bits of digital sensor data from the other RFID tags, and (ii) selectively transmit the digital sensor signal retrieved thereby;
- an RFID reader operable to receive the digital sensor signals selectively transmitted from each of the RFID tags, the RFID reader configured, upon receipt of the digital sensor signals, to (i) convert the digital sensor signals received from all of the RFID tags into the N-bit digital data packet representative of the sensed parameter and (ii) transmit the N-bit digital data packet; and
- a computer in operable communication with the RFID reader, the computer configured to receive and at least store the N-bit digital data packet.

20. The sensor system of claim 19, wherein the sensor circuit comprises:
- an analog sensor operable to sense a parameter and supply an analog sensor signal representative of the sensed parameter;
- an analog-to-digital converter (ADC) having N-bits of resolution, the ADC coupled to receive the analog sensor signal and operable to convert the analog sensor signal to the N-bits of digital sensor data.

* * * * *

UNITED STATES PATENT AND TRADEMARK OFFICE
CERTIFICATE OF CORRECTION

PATENT NO.       : 7,636,031 B2
APPLICATION NO.  : 11/416280
DATED            : December 22, 2009
INVENTOR(S)      : Mirmobin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 860 days.

Signed and Sealed this

Ninth Day of November, 2010

David J. Kappos
*Director of the United States Patent and Trademark Office*